United States Patent
Owens et al.

[11] 3,889,387
[45] June 17, 1975

[54] DIRECTIONAL GYROSCOPE

[75] Inventors: Frederick J. Owens, Butler, N.J.; Jerry B. Bishop, Wichita, Kans.; David Fidelman, Denver, Colo.

[73] Assignee: Aerosonic Corporation, Clearwater, Fla.

[22] Filed: July 7, 1971

[21] Appl. No.: 160,334

[52] U.S. Cl. ............................. 33/318; 116/124 A
[51] Int. Cl. .................... G01c 19/32; G01c 19/34
[58] Field of Search ..................................... 33/318

[56] References Cited
UNITED STATES PATENTS
2,470,482  5/1949  Gabrielson ...................... 33/318 X
2,704,457  3/1955  Gabrielson et al. ............... 33/318 X FOREIGN PATENTS OR APPLICATIONS
522,207  6/1940  United Kingdom ............... 33/318 X Primary Examiner—Robert B. Hull
Attorney, Agent, or Firm—Stein & Orman

[57] ABSTRACT

Apparatus for resetting the indicating dial of a directional gyroscopic-type instrument wherein depression of a reset element effects disengagement of one clutch and engagement of a second clutch in the drive line between the gyroscope and the dial. An actuator member, pivotally connected to a geared shaft and biasly connected to linkage connecting the geared shaft and the reset element, provides a positive over-center relationship of the parts during the reset operation without disturbing the gyroscope position.

2 Claims, 5 Drawing Figures

PATENTED JUN 17 1975 3,889,387

SHEET 1

INVENTORS
FREDERICK J. OWENS
JERRY B. BISHOP &
DAVID FIDELMAN

BY Louis A. Kline
Wilbert Hawk, Jr.
Geo J. Muckenthaler
THEIR ATTORNEYS

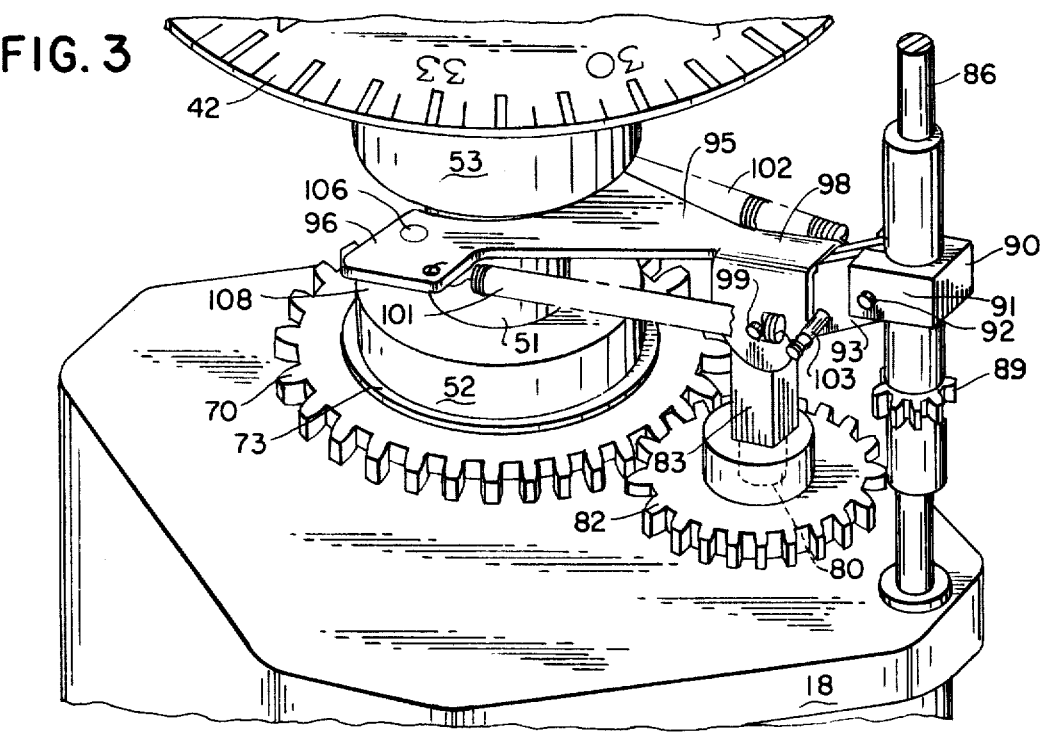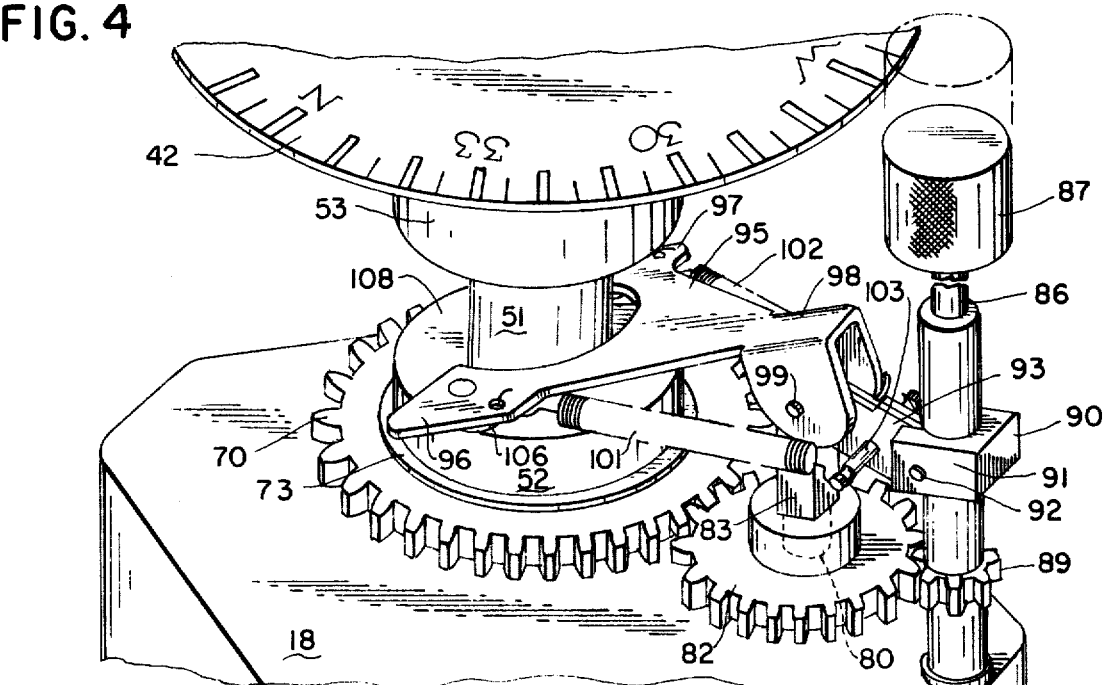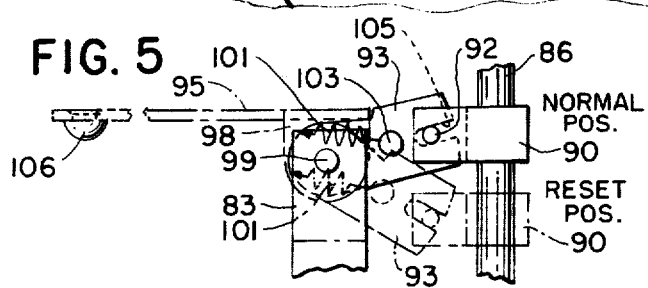

DIRECTIONAL GYROSCOPE

BACKGROUND OF THE INVENTION

Gyroscopic instruments, either the horizon gyro or the directional gyro type, have been widely used in aircraft for performance in which exactness and correctness are critical, and therefore much research and development has been directed to reliability in this field. In a directional gyro, of the type having freedom of movement about a vertical and two horizontal axes, it is desired to maintain a definite course without relying on complicated and bulky maneuvering equipment, which equipment is costly, requires more space, and also requires greater effort on the part of the pilot. Generally, the use of an indicating card or dial carried by the instrument has supplied the information to the pilot as to whether or not he was maintaining the desired course. In some arrangements, the card or dial was permanently supported from the frame of the gyroscope and it was difficult to maintain the axis of the gyro in a predetermined position with respect to the aircraft. Since gyroscopes in general are subject to precession, the subjection of the instrument to wandering or creeping from a set position by reason of friction and/or the earth's rotation, it is necessary to provide means for resetting the indicating card or dial without disturbing the axes of the gyro. It has been advanced that a caging mechanism be utilized while resetting the indicator, which mechanism would lock the inner and outer axes of the gyro and which becomes necessary to do so in certain conventional instruments of the directional type so as to prevent such precession of the inner axis at the time of resetting of the dial. In this respect, the gyro could be locked and the dial indicator could then be rotated to the desired position, after which the gyro is released to operate freely. This arrangement, of course, subjects the gyro to certain errors and it may become a trial-and-error as well as time-consuming operation.

The prior art shows certain structures for supporting a gyroscope for freedom about its several axes. U.S. Pat. No. 2,086,898, granted on the application of L. F. Carter, shows an indicating card secured to a rotatably mounted member which normally engages the periphery of a ring through friction or through small teeth, the member being secured at its center to a small block, loosely clamped in air-supported bearings to permit a limited rocking of the member to disengage the member from the ring upon depressing a spring-loaded knob having a conical collar thereon, and which depression causes engagement of the collar with the ring to reset the card when turning the knob while in the depressed position.

U.S. Pat. No. 2,099,705, issued on the application of W. A. Reichel, shows the provision of an indicating card which is separate from but adapted to be connected to the gyroscope so that during the setting operation, only the indicating card is set without moving the axis of the gyroscope, the card being carried by a plurality of circumferentially spaced arms which are secured to a rotatable bevel gear capable of upward and downward movement to permit and actuate such movement of the card by means of a mating bevel gear secured to an end of a slidable shaft on which is fixed an operators knob.

Additional prior art shows resetting means for a directional gyroscope having upper and lower races with rollers in a cage therebetween and including a gear drive between a setting member and the bottom race, the setting member axially movable to engage a socket connection, and including mating conical-surfaced members with a pinion to engage a toothed disc carrying a compass scale, wherein the pointer for the scale is reset by pressing and rotating the setting member which rotates the bottom race and the cage, all as taught by U.S. Pat. No. 2,334,116, issued on the application of F. W. Meredith.

U.S. Pat. No. 2,406,341, granted on the application of L. F. Beach, O. E. Esval, and A. W. Lane, discloses improvements in indicating and setting means for directional gyroscopes wherein a flat disc having teeth on its periphery is reset from a setting knob during locking of the gyro rotor-bearing case about its axis, the knob being secured to a shaft slidably journaled and carrying a spring-loaded pinion whereupon pressing of the knob engages the pinion teeth with the teeth on the flat disc for desired rotation thereof.

SUMMARY OF THE INVENTION

The present invention relates to directional gyroscopes and more particularly to a mechanism for resetting the indicating dial by means of disengagement and engagement of clutch members, and to positive-action means in the operation of the mechanism. The gyroscope includes a drive gear secured to the outer gimbal for the driving thereof, the drive gear being meshed with a dial gear on a dial gear shaft carrying a plurality of disc-and-hub type clutch assemblies, and additionally a clutch gear and a dial indicator. A spring-loaded dial set shaft has a pinion gear secured thereon to engage with the clutch gear carried on the dial gear shaft for desired rotation of the dial for resetting thereof. A dial clutch actuator plate, in the nature of a fork assembly, is pivotally connected to one end of an idler gear shaft journaled between the dial shaft pinion gear and the clutch gear, the actuator plate extending substantially around the dial gear shaft in winged manner with the wings being spring connected to linkage pivotally connecting the idler gear shaft and the dial set shaft. The linkage employs the effect of a lost motion connection in operation wherein the springs cause movement of the actuator plate in an instantaneous manner due to an over-center relationship upon sliding the dial shaft from an inactivated to a reset position. The actuator plate is generally triangular-shaped and bears upon one of the clutch assemblies to engage it and to disengage another clutch assembly so as to permit resetting of the dial indicator without disturbing the position of the gyroscope.

In accordance with the above discussion, the principal object of the present invention is to provide in directional gyroscopes a dial reset mechanism of simple and low cost structure.

Another object of the present invention is to provide apparatus for resetting the indicating dial without the need for caging the inner and outer axes of the gyroscope.

A further object of the present invention is to provide means for positive actuation and retention of the reset device.

An additional object of the present invention is to provide over-center means for biased engagement of clutch elements during reset operation.

Additional advantages and features of the present invention will become apparent and fully understood from the following specification taken together with the annexed drawings in which:

FIG. 3 is a perspective view of the reset mechanism in an inactivated or normal condition;

FIG. 4 is a similar view of the reset mechanism but showing the position of the parts during a reset operation; and FIG. 5 is a detailed view of the over-center linkage connection between the dial set shaft and the actuator plate.

Figure 1:
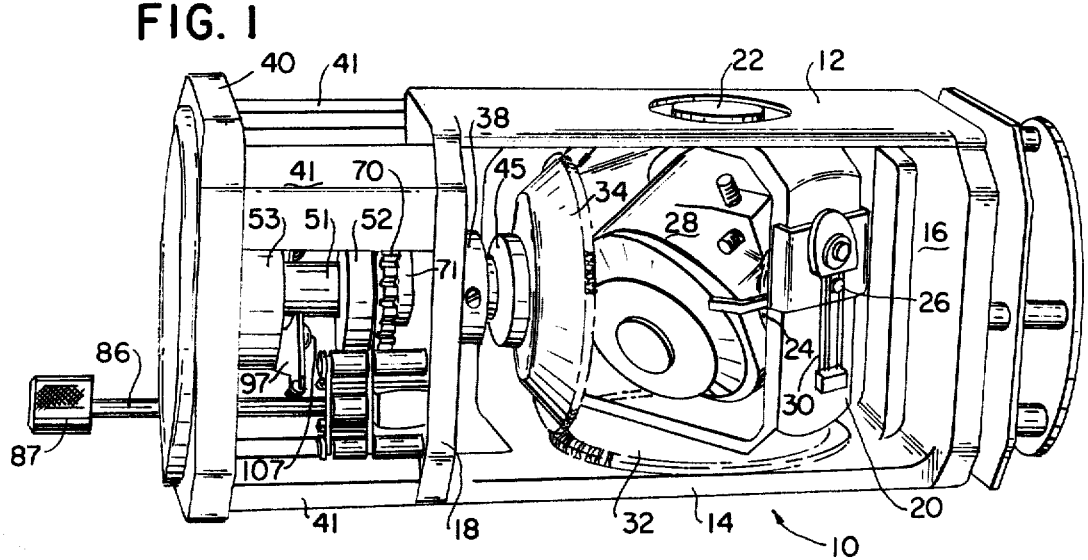
FIG. 1 is a perspective view of a directional gyroscope incorporating the structure of the present invention.

Referring to FIG. 1, there is shown a gyroscpe of the directional type, electrically spun, and contained within a framework generally designated as 10 having upper plate 12 and lower plate 14 with end plates 16 and 18 forming the enclosure for the gyro. An outer gimbal 20 is pivotally carried in suitable bearings 22 (only one shown) on a vertical axis, and an inner gimbal 24 is journaled in the outer gimbal in suitable bearings 26 (only one shown) along a horizontal axis, such inner gimbal providing a support for a rotor housing 28 containing the rotor (not shown) which spins on an axis normal to the axis of the inner gimbal 24. Electric lead wires 30 run along the side of the outer gimbal 20 to feed power to the rotor for spinning operation thereof. It is thus seen that the rotor housing 28 may rotate about a horizontal axis, and the outer gimbal may rotate about a vertical axis with the rotor spinning about its own axis.

Connected to the outer gimbal 20 and made an integral part at one end thereof is a drive gear 32 horizontally disposed and rotatable upon turning of the outer gimbal about its vertical axis, such drive gear being engaged with a bevel dial gear 34 of pan-shaped construction (FIG. 2) carried on one end of a dial gear shaft 35 journaled in bearings 36 and 37 situated at the ends of a bushing 38 horizontally supported in the end plate 18. The dial gear shaft 35 extends substantially through a compartment, forward of the gyroscope, framed by the end plate 18 and a face plate 40 secured together by suitable structural spacer members 41, the forward compartment containing a plurality of clutch assemblies operated for the purpose of resetting a dial indicator 42 (see also FIGS. 3 and 4). Means provided for securing the bevel gear 34 to the shaft 35 include a gear hub 45 slipped over the end of the shaft and retained in position thereon by a washer 46 and a screw 47.

Along the dial gear shaft 35 and toward the face of the instrument is dial hub 50 (FIG. 2), in the form of a double ended bushing having a reduced central portion 51, a shallow recessed flange portion 52 at one end, and a deeper recessed flange portion 53 at the opposite end, carried on suitable bearings 54 and 55 on the shaft. A compression spring 56 encircles the shaft 35 in the recess 57 of the flange portion 52 between the shaft carried bearings 37 and 54, and a compression spring 58 is contained within the bore of the reduced central portion 51 of the hub 50 between the shaft carried bearings 54 and 55 to maintain such bearings in position relative to each other. A ring member 60 is retained on the gyro-face-oriented end of the shaft 35 by a screw 61, there being a hub clutch disk 62 of cork or like material secured to the inner face of the ring member 60 and engageable with a face 64 of the recess 63 of flange portion 53. The other flange portion 52 of the hub 50 presents a face surface 65 engageable with a clutch member now to be described.

Figure 2:
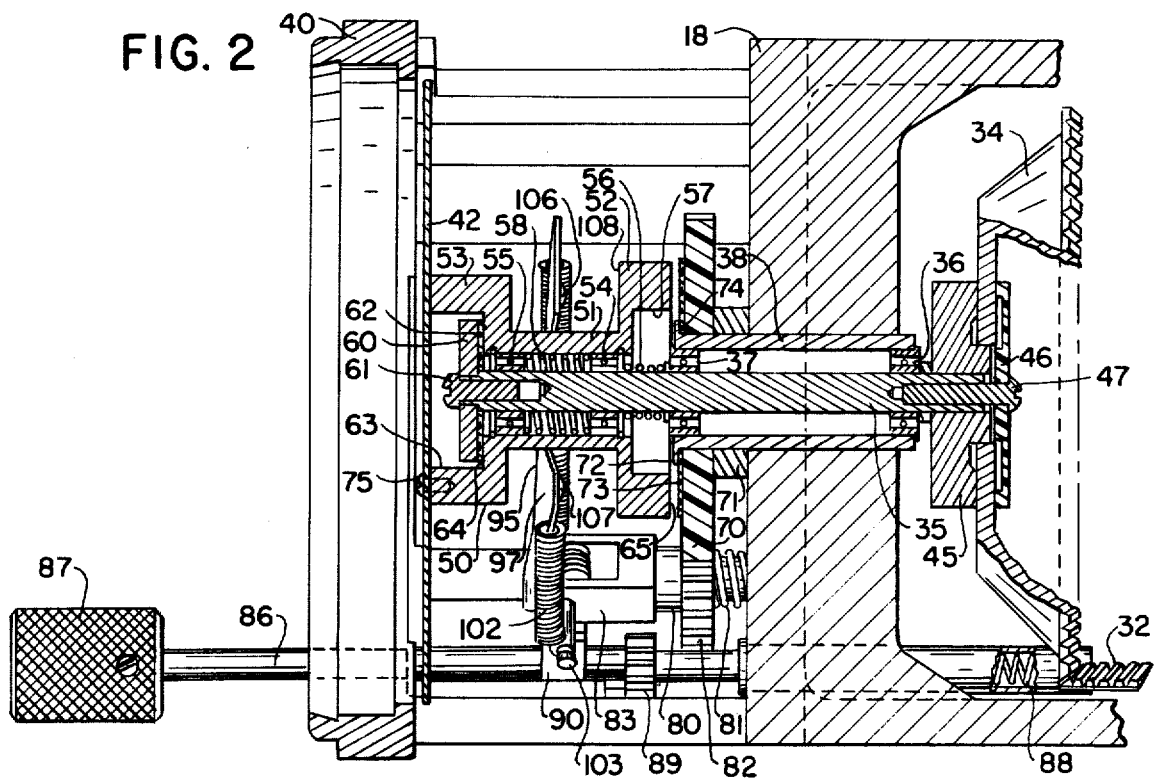
FIG. 2 is a side elevational view, partially in section, of the front portion of the gyroscope and showing a preferred embodiment of the present invention.

Carried on one end of the bushing 38 is a clutch gear 70 separated from end plate 18 by a spacer 71, the gear 70 having a gear clutch disk 73 suitably bonded to one side thereof. As illustrated in FIG. 2, bushing 38 has a narrow flange 72, and a spring washer 74 is seated adjacent the flange 72 for tolerance purposes and which washer is arcuate shaped in the free condition but pressed flat on installation thereof. The dial indicator 42 is secured to the face end of the hub 50 flange portion 53 by suitable means, such as screws 75, so as to be supported in fixed relationship with the dial hub 50 for rotation thereby.

An idler gear shaft 80 is fixed by one end thereof in the end plate 18 and carries rotatably thereon an idler gear 82 which meshes with the clutch gear 70. As illustrated, a spring member 81 maintains such gear 82 in yielding position relative to the framework plate 18. The other end of the shaft 80 has a bifurcated member 83 in the form of a clevis attached thereto and extending towards the face or dial indicator end of the instrument. Spaced from and parallel to the idler gear shaft 80 is a dial reset shaft 86 journaled in the end plate 18 and in the face plate 40 and extending beyond the front of the instrument 10 to receive an operator's knob 87. Such shaft 86 (FIG. 2) is yieldingly urged normally outwardly by a spring 88, and has a pinion gear 89 secured thereto and positioned thereon to be engageable with the idler gear 82 upon movement of the shaft by inward pushing of the knob 87 (see also FIGS. 3 and 4).

Since the importance of the present invention is directed to a dial reset mechanism, slidable movement of the shaft 86 in an inwardly direction accomplishes engagement of the pinion gear 89 with the idler gear 82 and causes slidable movement of the dial hub 50 along the shaft 35 to permit rotation of the dial indicator 42 without disturbing the position of the gyroscope.

The mechanism for effecting movement of the hub 50 for disengaging and engaging the clutch means therealong includes a connection to the dial reset shaft 86, wherein a clevis 90 is secured in position on the shaft (see FIGS. 3 and 4) with the bifurcated portions 91 extending in the direction toward the hub 50. A roll pin 92 is inserted through apertures in the bifurcated portions 91 and through an aperture in a link member 93, nested in portions 91 and pivotally swingable on the pin 92. Partially surrounding the central portion 51 of hub 50 in alar fashion is one end of an actuating means or fork assembly 95 having winged portions 96 and 97 merging into a bifurcated end portion 98 pivotally connected by a roll pin 99 to the free end of link member 93 and to the clevis 83 fixed to the idler shaft 80. The end portion 98 thus caps one end of link 93 and the clevis 83, as seen in FIGS. 3 and 4. A pair of springs 101 and 102 are connected to apertures in the respective winged portions 96 and 97 of the fork assembly 95, the springs extending toward the dial reset shaft 86 and connected to a spring pin 103 centrally positioned in the link member 93. The winged portions 96 and 97 have secured thereto nylon buttons 106 and 107 for engaging with surface 108 of hub portion 52 upon depression of the dial reset shaft 86 for moving end surface 65 of the hub 50 into engagement with gear clutch disk 73. FIG. 5 shows the arrangement of the linkage connections with the clevis 90, the bifurcated end portion 98, and the clevis 83 on the idler shaft 80, the full line position of the link 93 being a normal or inactivated position and the broken line position being an activated position of the various parts. As illustrated, one end of the link 93 has a slot 105 therein constituting a lost-motion connection with the roll pin 92 and effective during the resetting operation.

In the operation of the dial reset mechanism, the actuating and/or actuated parts assume one of two positions—either FIG. 3 which shows the parts in a normal or inactivated position or FIG. 4, the activated position. In the normal position (FIG. 3), it is seen that the parts including the clevis 90, the link member 93 and the fork assembly 95 are approximately in alignment and that pinion gear 89 is disengaged from idler gear 82 (see also FIG. 2). Also in the normal position of the parts, any rotation of drive gear 32, by reason of wandering or creeping of the gyroscope, will rotate dial gear 34, dial shaft 35, flange member 60, hub clutch disk 62, hub 50 and, of course, the dial 42. As seen in FIG. 2, at this time hub portion 52 is free and clear of clutch disk 73 and therefore clutch gear 70 and idler gear 82 are not affected by and do not rotate upon rotation of the dial shaft 35.

To reset the dial 42, the dial reset shaft 86 is slidably moved by depressing knob 87 so that the pinion gear 89 moves to engage with idler gear 82. At the same time, the clevis 90 on such shaft 86 carries one end of link member 93 with it while the other end of the link member pivots on roll pin 99. Since the winged portions 96 and 97 are connected by springs 101 and 102 to the spring pin 103, movement of pin 103 in a revolving manner about roll pin 99 carries pin 103 to an over-center position in relation to pin 99 and the winged portions 96 and 97 are swung so that the nylon buttons 106 and 107 thereof are urged into contact against surface 108 of the hub flange portion 52 to slide the hub 50 along shaft 35. In this manner, actuation of the fork assembly 95 disengages the one clutch member 62/64 and engages the other clutch member 65/73 so that the dial indicator 42 is free to be turned with respect to the dial gear shaft 35. As will be noted from FIG. 2, movement of the hub 50 in a rightward direction removes the recessed face surface 64 of hub portion 53 from contact with the clutch disk 62 and contact is then made between the outer face surface 65 of hub portion 52 and the clutch disk 73 which is maintained in contact with the dial gear 70. At this point, with the parts in the dial resettable position (FIG. 4), the knob 87 is turned in the desired direction and the motion is transmitted through the pinion gear 89, the idler gear 82, the dial gear 70 and hub 50 to the dial indicator 42, all being rotated without affecting the position of the drive gear 32 or the dial gear 34, and thus the position of the gyroscope. Release of the knob 87, after proper dial setting, slidably moves the shaft 86 in a leftward direction (FIG. 2) under pressure from spring 88, wherein the disengagement of the clutch 65/73 and engagement of the other clutch 62/64 is made and the linkage member 93 is returned to the slightly over-center normal position, as seen in FIGS. 3 and 5.

It is thus seen that herein shown and described is a dial reset mechanism for a directional gyroscope wherein the dial indicator can be moved independently from the gyroscope set position at any given time and without the necessity of caging the gyro axes. The over-center relationship of the parts insures a positive condition in either inactivated or activated position of the reset mechanism. While only one embodiment has been disclosed for the construction and operation of the reset mechanism, certain variations on the above may occur to those skilled in the art, so it is contemplated that all such variations having these features are within the scope of the invention.

What is claimed is:

1. In a directional gyroscope having a driving gear and a driven gear, a dial shaft secured to the driven gear and carrying a dial hub slidably journaled thereon and having clutch means fixed on the shaft normally engaged with said dial hub to rotate therewith, and a dial secured to the dial hub, dial reset mechanism comprising a clutch gear rotatable on the dial shaft and positioned to be engageable by the dial hub, and means for disengaging the dial hub from the dial shaft and for engaging the dial hub with the clutch gear, said disengaging and engaging means comprising a stub shaft and a dial reset shaft parallel to said dial shaft, an idler gear and a pinion gear on said stub shaft and said reset shaft, respectively, an actuating arm pivotably connected to the stub shaft and having winged portions engageable with said dial hub, a linkage member connected at one end to the stub shaft-actuating arm pivotal connection and at the other end to the dial reset shaft, said linkage member including a lost-motion connection therein, the pinion gear being connected for rotating the idler gear, and, in turn, the clutch gear and the dial upon contact of the actuating arm winged portions with the dial hub and upon contact of the dial hub with the clutch gear, and a pair of springs connected to the actuating arm winged portions and to the linkage member for moving the end of the linkage member connected to the dial reset shaft in over-center relationship with respect to the arm and stub shaft pivotal connection upon depression of said dial reset shaft to slidably move said dial hub into engagement with said clutch gear for resetting the dial separate from the driving and driven gears and the dial shaft.

2. In a directional gyroscope having an outer and an inner gimbal, a rotor carried on the inner gimbal, a driving gear secured to the outer gimbal for rotation therwith, a dial gear on a dial shaft and meshing with the driving gear to be driven thereby in response to swinging of the outer gimbal, a dial normally rotatable by the dial gear, and means for resetting the dial separate from the swinging of the outer gimbal, the combination of clutch means carried on the dial shaft and slidable from a dial and dial shaft connected position to a dial and dial shaft disconnected position, a stub shaft and a reset shaft positioned parallel adjacent the clutch means and the dial shaft, a link pivotally connected to the stub shaft and to the reset shaft, said link including a lost-motion connection therein, and actuating means having winged portions engageable with said clutch means, said actuating means being pivotally connected at one end thereof to the stubshaft-link pivotal connection and biasly connected to said winged portions at the other end thereof and to said link whereby movement of the reset shaft in one direction positions said winged portions of the actuating means in contact with the clutch means to slide it along the dial shaft thereby disconnecting the dial from the dial gear, said winged portions of the actuating means assuming an over-center relationship with respect to the stub shaft-link pivotal connection.

* * * * *